(No Model.)

C. A. LUTHER.
Oiling Device.

No. 231,182. Patented Aug. 17, 1880.

WITNESSES.
W. H. Thurston
J. Knight

INVENTOR.
Charles A. Luther

UNITED STATES PATENT OFFICE.

CHARLES A. LUTHER, OF PAWTUCKET, RHODE ISLAND.

OILING DEVICE.

SPECIFICATION forming part of Letters Patent No. 231,182, dated August 17, 1880.

Application filed July 7, 1880. (No model.)

*To all whom it may concern:*

Be it known that I, CHARLES A. LUTHER, of Pawtucket, in the county of Providence and State of Rhode Island, have invented a new and useful Improvement in Oiling Devices for the Cams of Cloth-Stretching Machines; and I do hereby declare that the following specification, taken in connection with the accompanying drawings, forming a part of the same, is a full, clear, and exact description thereof.

My invention relates generally to a cloth-stretching machine such as is shown and described in Letters Patent of the United States No. 190,600, granted to me May 8, 1877, and reissued October 7, 1879, No. 8,922.

My improvement consists in providing the cams of such a machine with oil-reservoirs, which are stuffed with fibrous material, and in perforating the said cams to allow the oil in said reservoirs to be applied to the rotary rings mounted on said cams for the purpose of lubrication. Before my invention these rotary rings were lubricated by oil introduced to them through holes passing from the exterior to the interior of the cams—that is, in a manner common to bearings. The result of this method of oiling has been an unnecessary amount of care on the part of the attendant and a waste of the lubricant, which would pass out between the ring and the cam.

The object of my improvement is to thoroughly and evenly lubricate the cam and ring, to reduce the amount of attention heretofore necessary, and to prevent a waste of the lubricant.

Figure 1:
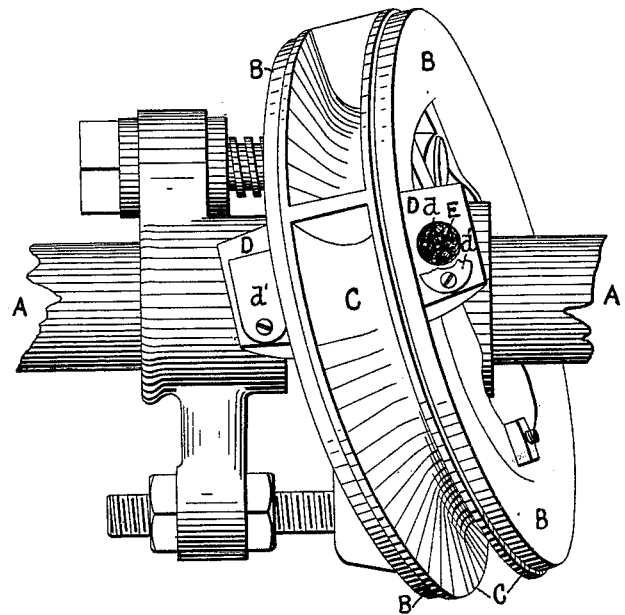
Figure 2:
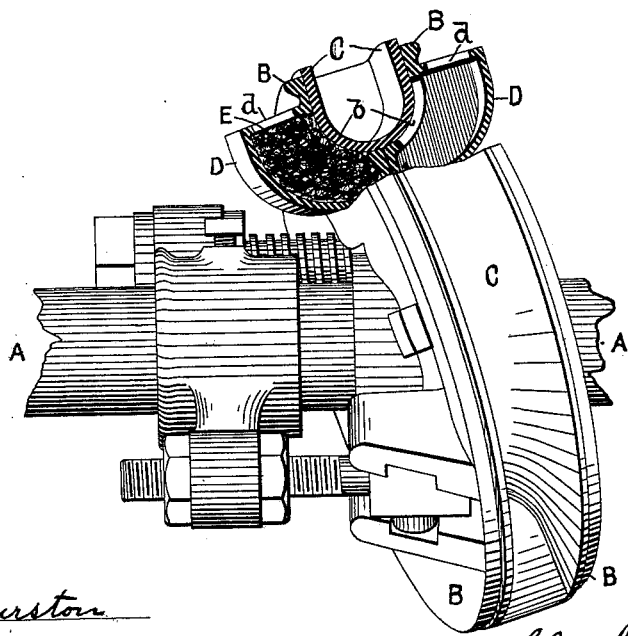

Referring to the drawings, Figure 1 represents a top view of the cam and ring mounted upon a shaft, and Fig. 2 shows a side view of the same partially in transverse section through the oil-reservoirs.

A represents the central shaft of a cloth-stretching machine, upon which the cam B is mounted so that its angle of inclination to the shaft may be varied.

C is the chambered ring, mounted on the cam B so as to rotate, the said ring being in engagement with the outer block in each series of linked stretches in a well-understood way.

As shown in both figures of the drawings, the cam B is provided on both sides with boxes or oil-reservoirs D D, which are integral with the cam or are securely attached thereto. Each reservoir D is provided with an opening, $d$, to admit the oil, and a cover, $d'$, to close such opening and prevent the entrance of dust, &c.

As shown in Fig. 2, the cam B is provided at the reservoirs with slots or perforations $b$ to admit the oil to the ring C. Each reservoir is filled with fibrous material E, which absorbs the oil, and by contact with the ring furnishes the necessary amount of lubrication to the parts.

The exact shape, number, and location of the oil-reservoirs is immaterial; but I prefer to arrange them as shown in the drawings.

I do not claim, broadly, an oil-reservoir filled with fibrous material; but

What I claim, and desire to secure by Letters Patent, is—

In a cloth-stretching machine, the combination of the perforated cam B, the ring C mounted thereon, and a lubricant reservoir or reservoirs integral with said cam or attached thereto and containing fibrous material, substantially as and for the purpose specified.

CHARLES A. LUTHER.

Witnesses:
W. H. THURSTON,
I. KNIGHT.